United States Patent [19]
Asghar et al.

[11] Patent Number: 6,009,391
[45] Date of Patent: Dec. 28, 1999

[54] LINE SPECTRAL FREQUENCIES AND ENERGY FEATURES IN A ROBUST SIGNAL RECOGNITION SYSTEM

[75] Inventors: Safdar M. Asghar; Lin Cong, both of Austin, Tex.

[73] Assignee: Advanced Micro Devices, Inc., Sunnyvale, Calif.

[21] Appl. No.: 08/907,145

[22] Filed: Aug. 6, 1997

Related U.S. Application Data

[63] Continuation-in-part of application No. 08/883,980, Jun. 27, 1997.

[51] Int. Cl.[6] .................................................. G01L 5/06
[52] U.S. Cl. ..................... 704/243; 704/222; 704/236; 704/238
[58] Field of Search .................... 704/243, 238, 704/236, 222

[56] References Cited

U.S. PATENT DOCUMENTS

| | | | |
|---|---|---|---|
| 4,383,135 | 5/1983 | Scott et al. | 704/236 |
| 4,519,094 | 5/1985 | Brown et al. | 704/243 |
| 4,933,973 | 6/1990 | Porter | 704/233 |

(List continued on next page.)

OTHER PUBLICATIONS

Rabiner, Lawrence and Juang, Biing–Hwang; "Fundamentals of Speech Recognition" 1993; pp. 190–195.

Xydeas, C.S. Prof. and Cong, Lin "Robust Speech Recognition Using Fuzzy Matrix Quantisation, Neural Networks and Hidden Markov Models" Sep. 1996, pp. 1587–1590.

Cong, Ling, Xydeas, Costas S. Prof. and Ferwood, Anthony F. Combining Fuzzy Vector Quantisation and Neural Network Classification for Robust Isolated Word Speech Recognition: Singapore ICCS 1994, pp. 884–887.

(List continued on next page.)

*Primary Examiner*—David R. Hudspeth
*Assistant Examiner*—Donald L. Storm

*Attorney, Agent, or Firm*—Skjerven, Morrill, MacPherson, Franklin & Friel, L.L.P.; Kent B. Chambers

[57] ABSTRACT

One embodiment of a speech recognition system is organized with speech input signal preprocessing and feature extraction followed by a fuzzy matrix quantizer (FMQ). Frames of the speech input signal are represented in a matrix by a vector f of line spectral pair frequencies and energy coefficients and are fuzzy matrix quantized to respective vector $\hat{f}$ entries of a matrix codeword in a codebook of the FMQ. The energy coefficients include the original energy and the first and second derivatives of the original energy which increase recognition accuracy by, for example, being generally distinctive speech input signal parameters and providing noise signal suppression especially when the noise signal has a relatively constant energy over at least two time frame intervals. To reduce data while maintaining sufficient resolution, the energy coefficients may be normalized and logarithmically represented. A distance measure between f and $\hat{f}$, $d(f, \hat{f})$, is defined as $$d(f, \hat{f}) = \sum_{i=1}^{G} \alpha_1 [(f_i - e_i^{\beta_1} - \hat{f}_i)]^2 + \sum_{i=G+1}^{P} \alpha_2 [(f_i - \hat{f}_i)e_i^{\beta_2}]^2 + \sum_{i=P+1}^{P+3} \alpha_3 [E_i - \hat{E}_i]^2$$

where the constants $\alpha_1$, $\alpha_2$, $\beta_1$ and $\beta_2$ are set to substantially minimize quantization error, $e_i$ is the error power spectrum of the speech input signal and a predicted speech input signal at the ith line spectral pair frequency of the speech input signal, the first G LSP frequencies are most likely to be frequency shifted by noise, and the last P+3 coefficients represent the three energy coefficients. This robust distance measure can be used to enhance speech recognition performance in generally any speech recognition system using line spectral pair based distance measures.

35 Claims, 6 Drawing Sheets

U.S. PATENT DOCUMENTS

| | | | |
|---|---|---|---|
| 4,975,955 | 12/1990 | Taguchi | 704/219 |
| 5,031,217 | 7/1991 | Nishimura | 381/43 |
| 5,046,099 | 9/1991 | Nishimura | 704/256 |
| 5,185,848 | 2/1993 | Aritsuka et al. | 704/202 |
| 5,228,087 | 7/1993 | Bickerton | 704/232 |
| 5,255,339 | 10/1993 | Fette et al. | 704/200 |
| 5,285,522 | 2/1994 | Mueller | 704/232 |
| 5,313,555 | 5/1994 | Kamiya | 704/233 |
| 5,414,796 | 5/1995 | Jacobs et al. | 395/2.3 |
| 5,583,888 | 12/1996 | Ono | 375/240 |
| 5,596,679 | 1/1997 | Wang | 704/236 |
| 5,625,747 | 4/1997 | Goldberg et al. | 704/243 |
| 5,696,878 | 12/1997 | Ono et al. | 704/250 |
| 5,734,793 | 3/1998 | Wang | 704/232 |

OTHER PUBLICATIONS

Parsons, Thomas W,; "Voice and Speech Processing"; McGraw–Hill, Inc., New York, 1987; pp. 170–171.

Xydeas, C.S. and Lin Cong; "Robust Speech Recognition Using Fuzzy Matrix Quantization and Neural Networks"; Proceedings of International Conference on Communication Technology; Beijing, China –ICCT '96; pp. 432–435; IEEE; New York (May 5–7,1996).

Cong, Lin; "A Study of Robust IWSR Systems"; PhD Thesis submitted to The University of Manchester School of Engineering, Division of Electrical Engineering; Manchester, United Kingdom; pp. 1–209, May 1996.

Waibel, Alexander; "Neural Network Approaches for Speech Recognition"; Chapter 18 of *Advances in Speech Signal Processing*; edited by Sadaoki Furui and M. Mohan Sondhi; Marcel Dekker, Inc. ; New York, New York; 1992; pp. 555–595.

Xydeas, C.S. and Cong, L.; "Combining Neural Network Classification with Fuzzy Vector Quantization and Hidden Markov Models for Robust Isolated Word Speech Recognition"; *Signal Processing VIII Theories and Applications*, vol. III; Proceedings of the IEEE International Symposium on Information Theory IEEE Press, 1995, p.174.

Xydeas, C.S. and Cong, L; "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conference, Sep. 13–16, 1994; Scotland, UK.; 4 pages.

Gibson, Jerry D.; "Coding, Transmission, and Storage"; Chapter 14, Speech Signal Processing, of*The Electrical Engineering Handbook*; Editor–in–Chief Richard C. Dorf; ©1993 by CRC Press, Inc.; pp. 279–314.

Gersho, Allen and Shihua Wang; "Vector Quantization Techniques in Speech Coding"; Chapter 2 of *Advances in Speech Signal Processing*; edited by Sadoki Furui and Mohan Sondhi; Marcel Dekker, Inc.; New York, New York; 1992; pp.49–84.

Kroon, Peter and Bishnu S. Atal; "Predictive Coding of Speech Using Analysis–by–Synthesis Techniques"; Chapter 5 of *Advances in Speech Signal Processing*; edited by Sadaoki Furui and M. Mohan Sondhi; Marcel Dekker, Inc.; New York, New York; 1992; pp. 141–164.

Honda, Masaaki and Yoshinao Shiraki; "Very Low–Bit–Rate Speech Coding"; Chapter 7 of *Advances in Speech Signal Processing*; edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing*; edited by Sadaoki Furui and M. Mohan Sondhi; Marcel Dekker, Inc.; New York, New York; 1992; pp. 231–268.

LINE SPECTRAL FREQUENCIES AND ENERGY FEATURES IN A ROBUST SIGNAL RECOGNITION SYSTEM

PRIOR APPLICATION REFERENCE

This is a continuation-in-part of U.S. patent application Ser. No. 08/883,980, filed Jun. 27, 1997, by Safdar M. Asghar and Lin Cong and entitled "Robust Distance Measure In A Speech Recognition System".

BACKGROUND OF THE INVENTION

1. Field of the Invention

This invention relates to speech recognition systems and more particularly to speech recognition systems having robust speech parameters that include speech input signal energy coefficients.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition (CSR) systems. The SD/SI IWSR/CSR system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) the speech input signal with a satisfactory probability of accuracy. Difficulty in correct recognition arises particularly when operating in an acoustically noisy environment. Recognition accuracy may be severely and unfavorably impacted under realistic environmental conditions where speech is corrupted by various levels of acoustic noise.

FIG. 1 generally characterizes a speech recognition process by the speech recognition system 100. A microphone transducer 102 picks up a speech input signal and provides to signal preprocessor 104 an electronic signal representation of the composite acoustic signal 101. The acoustic signal 101 is an acoustic waveform of a spoken input speech signal, typically a word, or a connecting string of words and a noise signal when generated in an acoustically noisy environment. The signal preprocessor 104 may, for example, filter the acoustic signal 101, and a feature extractor 106 extracts selected information from the acoustic signal 101 to characterize the signal with, for example, cepstral frequencies or line spectral pair frequencies (LSPs).

Referring to FIG. 2, more specifically, feature extraction in operation 106 is basically a data-reduction technique whereby a large number of data points (in this case samples of the acoustic signal 101 recorded at an appropriate sampling rate) are transformed into a smaller set of features which are "equivalent", in the sense that they faithfully describe the salient properties of the acoustic signal 101. Feature extraction is generally based on a speech production model which typically assumes that the vocal tract of a speaker can be represented as the concatenation of lossless acoustic tubes (not shown) which, when excited by excitation signals, produces a speech signal. Samples of the speech waveform are assumed to be the output of a time-varying filter that approximates the transmission properties of the vocal tract. It is reasonable to assume that the filter has fixed characteristics over a time interval of the order of 10 to 30 milliseconds (ms). Thus, short-time speech input signal portion of acoustic signal 101 may be represented by a linear, time-invariant all pole filter designed to model the spectral envelope of the signal in each time frame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates a acoustic signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, every 10–30 ms, to represent the changing vocal tract. LP prediction coefficients are calculated using a variety of well-known procedures, such as autocorrelation and covariance procedures, to minimize the difference between the actual acoustic signal 101 and a predicted acoustic signal 101 and are often stored as a spectral envelope reference pattern. The LP prediction coefficients can be easily transformed into several different representations including cepstral coefficients and line spectrum pair (LSP) frequencies. Details of LSP theory can be found in N. Sugarnura, "Speech Analysis and Synthesis Methods Developed at ECL in NTT-from LPC to LSP", Speech Communication 5, Elsevier Science Publishers, B. V., pp. 199–215 (1986).

Final decision-logic classifier 108 utilizes the extracted information to classify the represented speech input signal to a database of representative speech input signals. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing acoustic signal 101 are segmented into short-term speech input signal frames and considered to be stationary within each frame for 10 to 30 msec duration. The extracted features may be represented by a P-dimensional vector and compared with predetermined, stored reference patterns 208 by the pattern similarity operation 210. Similarity between the acoustic signal 101 pattern and the stored reference patterns 208 is determined in pattern similarity operation 210 using well-known vector quantization processes. The vector quantization process yields spectral distortion or distance measures to quantify the score of fitness or closeness between the representation of acoustic signal 101 and each of the stored reference patterns 208.

Several types of spectral distance measures have been studied in conjunction with speech recognition including LSP based distance measures such as the LSP Euclidean distance measure (dLSP) and weighted LSP Euclidean distance measure (dWLSP). They are defined by $$dLSP = \sum_{i=1}^{P} (f_R(i) - f_S(i))^2$$

and $$dWLSP = \sum_{i=1}^{P} w(i)(f_R(i) - f_S(i))^2$$

where, $f_R(i)$ and $f_s(i)$ are the ith LSPs of the reference and speech vectors, respectively. The factor "w(i)" is the weight assigned to the ith LSP and P is the order of LPC filter. The weight factor w(i) is defined as:

$$w(i) = [P(f_s(i))]^r$$

here P(f) is the linear prediction coding ("LPC") power spectrum associated with the speech vector as a function of frequency, f, and r is an empirical constant which controls the relative weights given to different LSPs. In the weighted Euclidean distance measure, the weight assigned to a given LSP is proportional to the value of LPC power spectrum at this LSP frequency.

The decision rule operation 212 receives the distance measures and determines which of the reference patterns 208 the acoustic signal 101 most closely represents. In a "hard" decision making process, acoustic signal 101 is matched to one of the reference patterns 208. This one-to-one "hard decision" ignores the relationship of the acoustic signal 101 to all the other reference patterns 208. Fuzzy methods have been introduced to provide a better match between vector quantized frames of acoustic signal 101 and reference patterns 208. In a "soft" or "fuzzy" decision making process, acoustic signal 101 is related to one or more reference patterns 208 by weighting coefficients.

Matrix quantization has also been used to introduce temporal information about acoustic signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decision using interframe information related to the "evolution" of the short-term spectral envelopes of acoustic signal 101.

Thus, various classification techniques have been devised to improve classification probability. However, acoustical noise continues to have an adverse impact on speech classification. Accordingly, a need exists to provide more effective noise signal annulment.

SUMMARY OF THE INVENTION

In one embodiment, acoustic input signals representing a speech word signal which may be corrupted by an acoustic noise signal are processed to determine signal properties useful for representing speech input signals and building codeword databases for differentiating respective speech words and for suppressing the corruptive impact of the noise signal upon speech signals. In another embodiment, the signal properties include a coefficient representing the energy of the acoustic input signal which is generally distinct between speech words, especially when uncorrupted by noise, and, thus, can be used to classify the acoustic input signal as a particular word. The primary energy in a noise signal is generally concentrated at low frequencies and, is approximately constant relative to speech word signal energy over small, predetermined periods of time. By generating the first derivative of the acoustic input signal energy, a property of the speech word signal may be generally isolated from the noise signal and utilized to further increase classification (recognition) accuracy. Moreover, a second derivative of the acoustic input signal energy may also increase classification accuracy by further suppressing the noise signal contribution and, thus, isolating the speech word signal contribution. Furthermore, in another embodiment, to effectively reduce the amount of data utilized to classify the speech input signal, a frame with the maximum acoustic input signal energy over a predetermined interval of time may be used to normalize the frame energy of each of TO acoustic input signal frames, where TO is an integer. Also, in another embodiment, the amount of data utilized to represent the speech input signal may be decreased by utilizing the logarithm of the speech input signal normalized energy and the respective logarithms of the first and second derivatives of the normalized energy. Additionally, the energy coefficients, may be combined with other speech signal parametric information such as line spectral pairs to provide a further robust set of speech parameters.

In another embodiment, a speech recognition system utilizes the acoustic input signal energy parameters and spectral parametric data with a robust distance measure to adapt to predetermined or dynamically determined acoustic noise by frequency weighting and frequency shifting spectral distance measures. In another embodiment, when speech is corrupted in a generally low frequency noise environment such as an automotive environment, in addition to utilizing the acoustic input signal energy coefficients, low frequency LSP distance measure components are selectively shifted and high frequency LSP distance measure coefficients of the speech input signal are selectively weighted. This robust LSP distance measure combined with the processed energy coefficients may enhance the accuracy of speech recognition systems such as Fuzzy Matrix Quantization/Hidden Markov Model/Multilevel Perceptron neural network ("FMQ/HMM/MLP"), Fuzzy Vector Quantization/Hidden Markov Model/Multilevel Perceptron neural network ("FVQ/HMM/MLP"), Fuzzy MatrixQuantization/Hidden Markov Model ("FMQ/HMM"), Fuzzy Vector Quantization/Hidden Markov Model ("FVQ/HMM"), Fuzzy Matrix Quantization/Multilevel Perceptron neural network ("FMQ/MLP"), Fuzzy Vector Quantization/Multilevel Perceptron neural network ("FVQ/MLP") non-fuzzy corresponding systems, and generally any other system using line spectral pair distance measures.

In another embodiment of the present invention, a speech recognition system includes a speech processing module for representing an acoustic input signal as a number of frames with each frame represented by an Nth order vector having respective line spectral pair frequency coefficients for P orders, a first energy coefficient representing original energy of the acoustic input signal for the respective frame, and a second energy coefficient representing a first derivative of the original energy of the acoustic input signal for the respective frame, wherein N and P are integers.

In another embodiment of the present invention, a method of generating a robust distance measure in a speech recognition system includes the steps of determining energy coefficients of each of X frames of an acoustic input signal and determining P order line spectral pair frequencies for the acoustic input signal. The method further includes the steps of determining a difference between the energy coefficients of the acoustic input signal and corresponding energy coefficients of a plurality of reference codewords, determining a difference between the respective P line spectral frequencies of the acoustic input signal and corresponding P line spectral frequencies of the reference codewords, and utilizing the energy coefficients and line spectral pair frequencies differences to classify the speech input signal as one of the reference codewords.

In another embodiment of the present invention, a method of robust speech recognition in an automotive environment includes the steps of receiving an acoustic input signal, representing each frame of the acoustic input signal with a vector f of P line spectral pair frequencies and X energy coefficients, and representing a codeword in a quantizer codebook as a vector f̂ of P line spectral pair frequencies and X energy coefficients. The method further includes the steps of determining a distance measure between the vector f and the vector f̂, wherein the distance measure, d(f, f̂), is defined by:

$$d(f, \hat{f}) = \sum_{i=1}^{G} \alpha_1 \left[ (f_i - e_i^{\beta_1} - \hat{f}_i) \right]^2 + \sum_{i=G+1}^{P} \alpha_2 \left[ (f_i - \hat{f}_i) e_i^{\beta_2} \right]^2 + \sum_{i=P+1}^{P+3} \alpha_3 \left[ E_i - \hat{E}_i \right]^2,$$

wherein the constants $\alpha_1$, $\alpha_2$, $\alpha_3$, $\beta_1$, and $\beta_2$ are set to substantially minimize quantization error, and $e_i$ is the error power spectrum of the acoustic input signal and a predicted acoustic input signal at the ith line spectral pair frequency of the acoustic input signal.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

Figure 1:
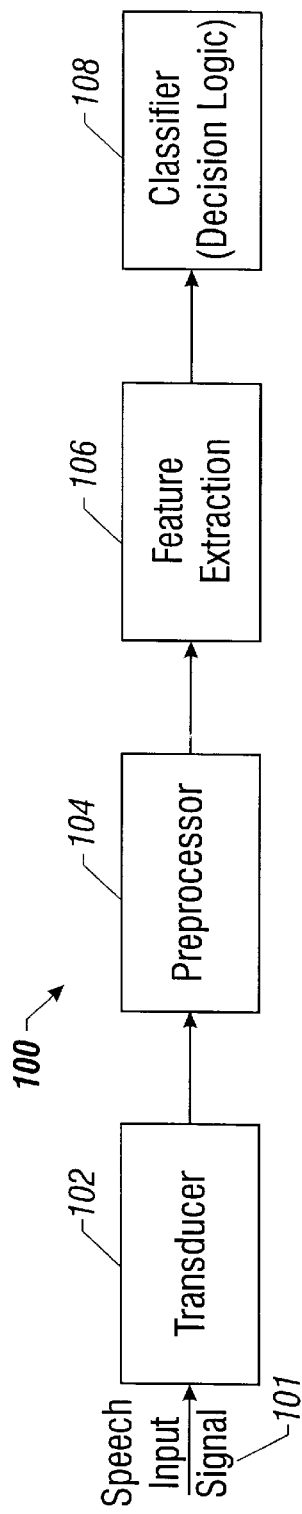
FIG. 1, labeled prior art, illustrates a general speech recognition system.
Figure 2:
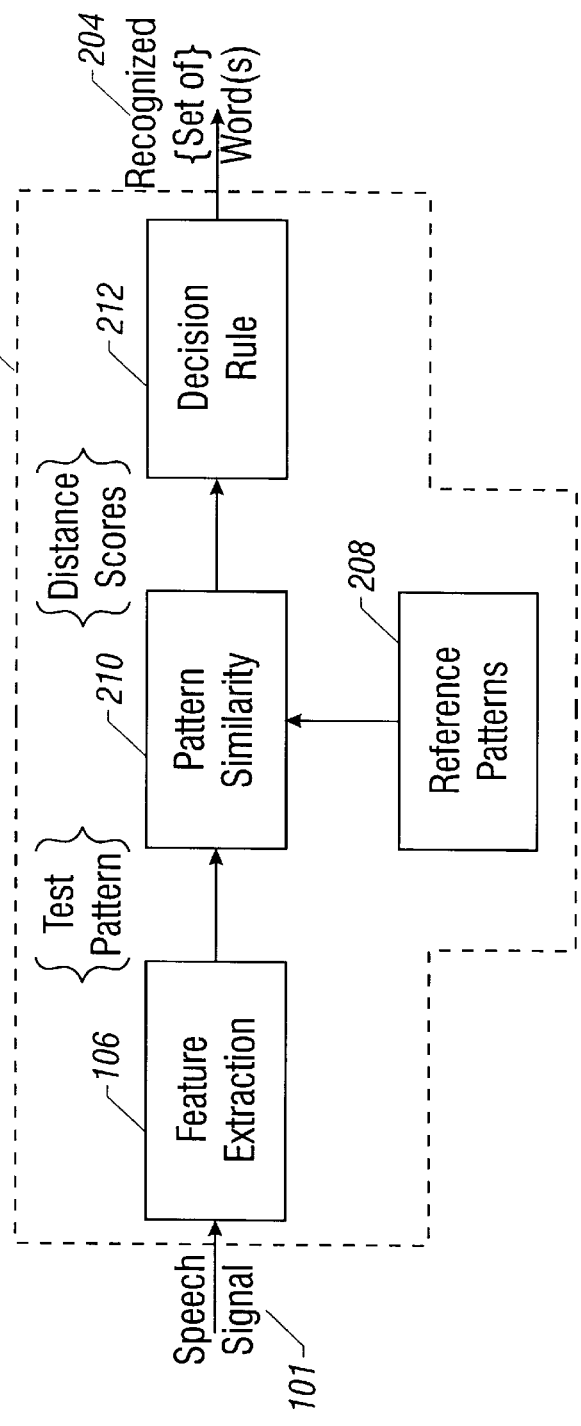
FIG. 2 illustrates a pattern-recognition based speech recognition system.
Figure 3:
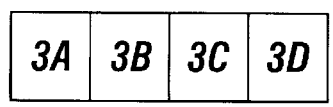
FIG. 3 illustrates an FMQ/HMM/MLP speech recognition system.
Figure 3A:
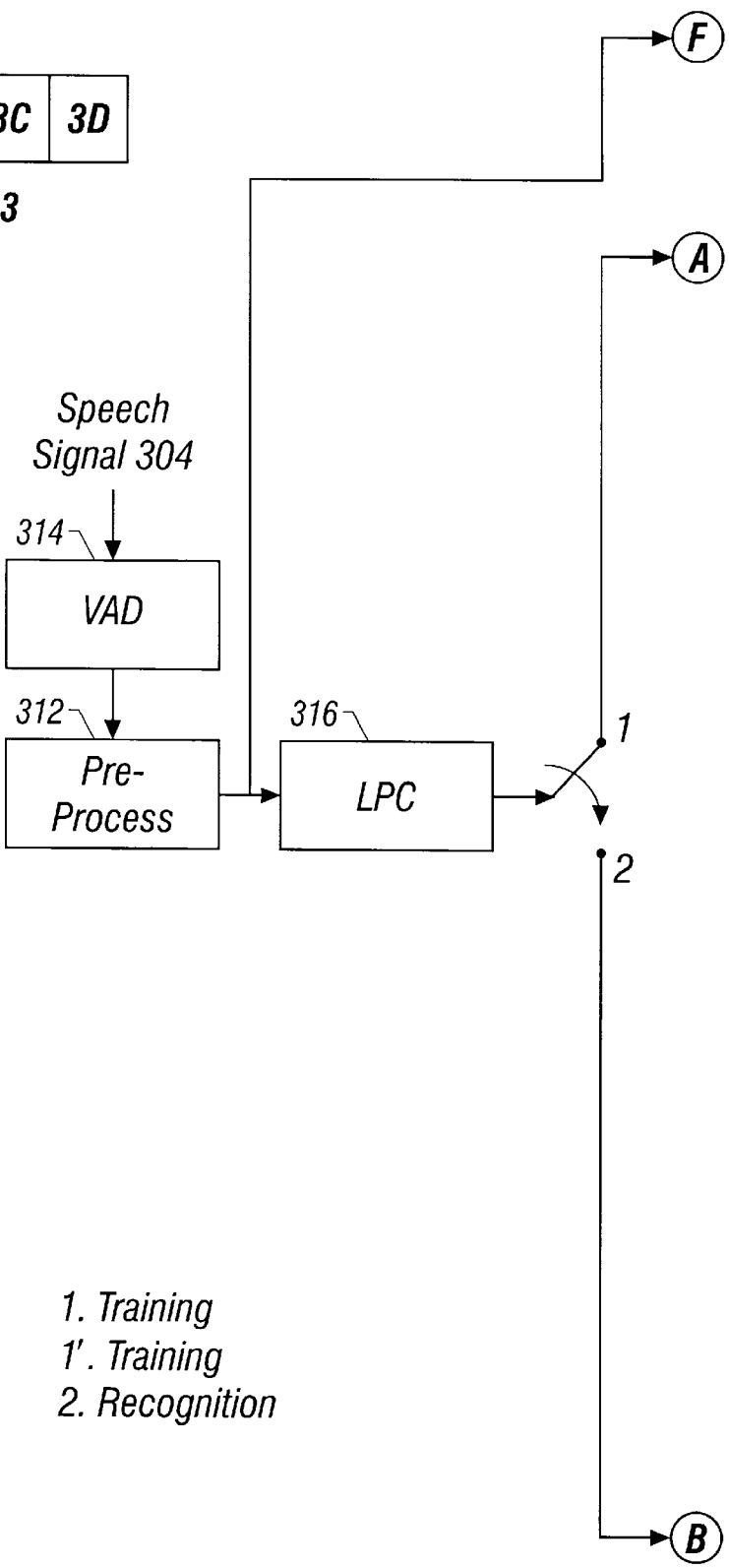
Figure 3B:
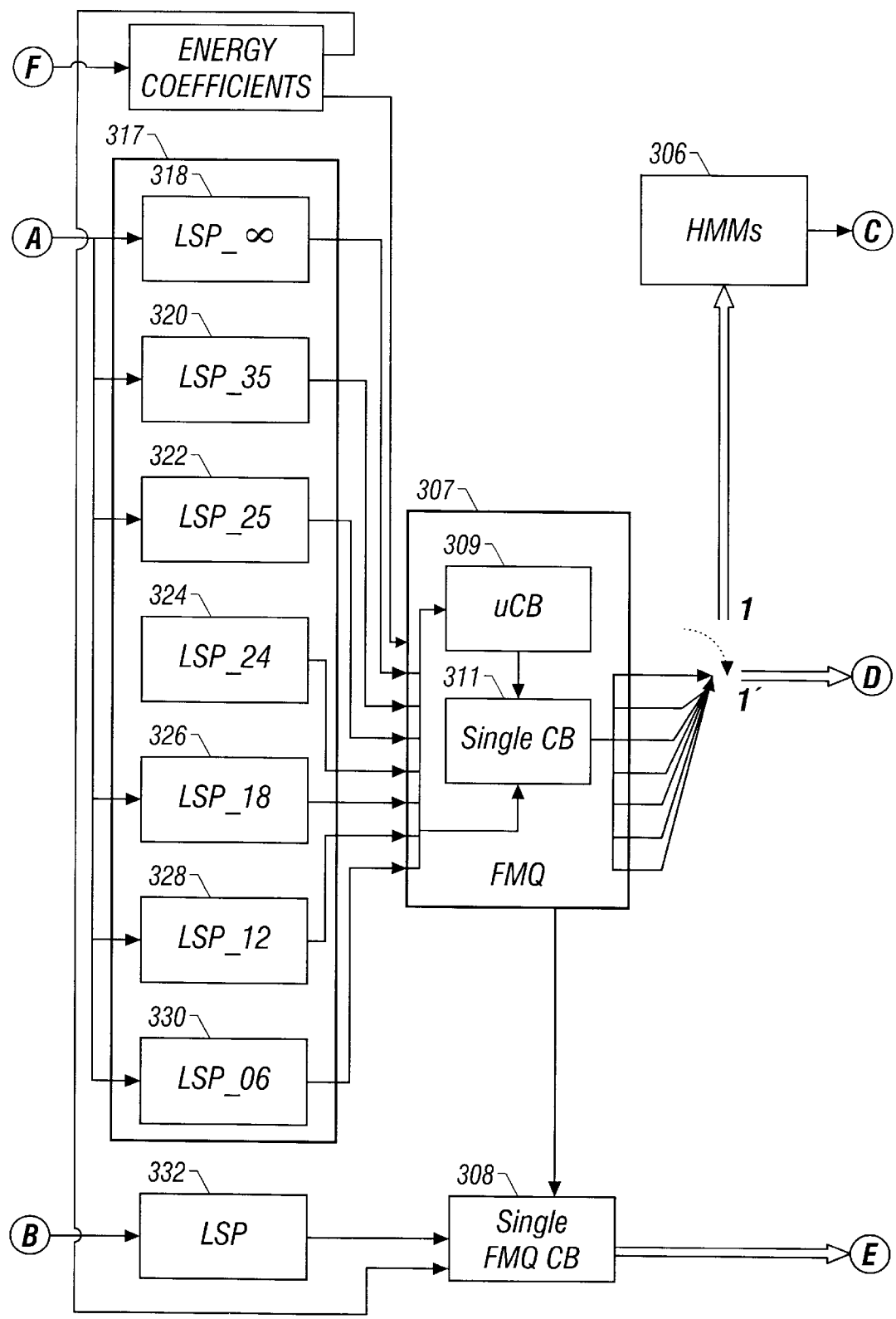
Figure 3C:
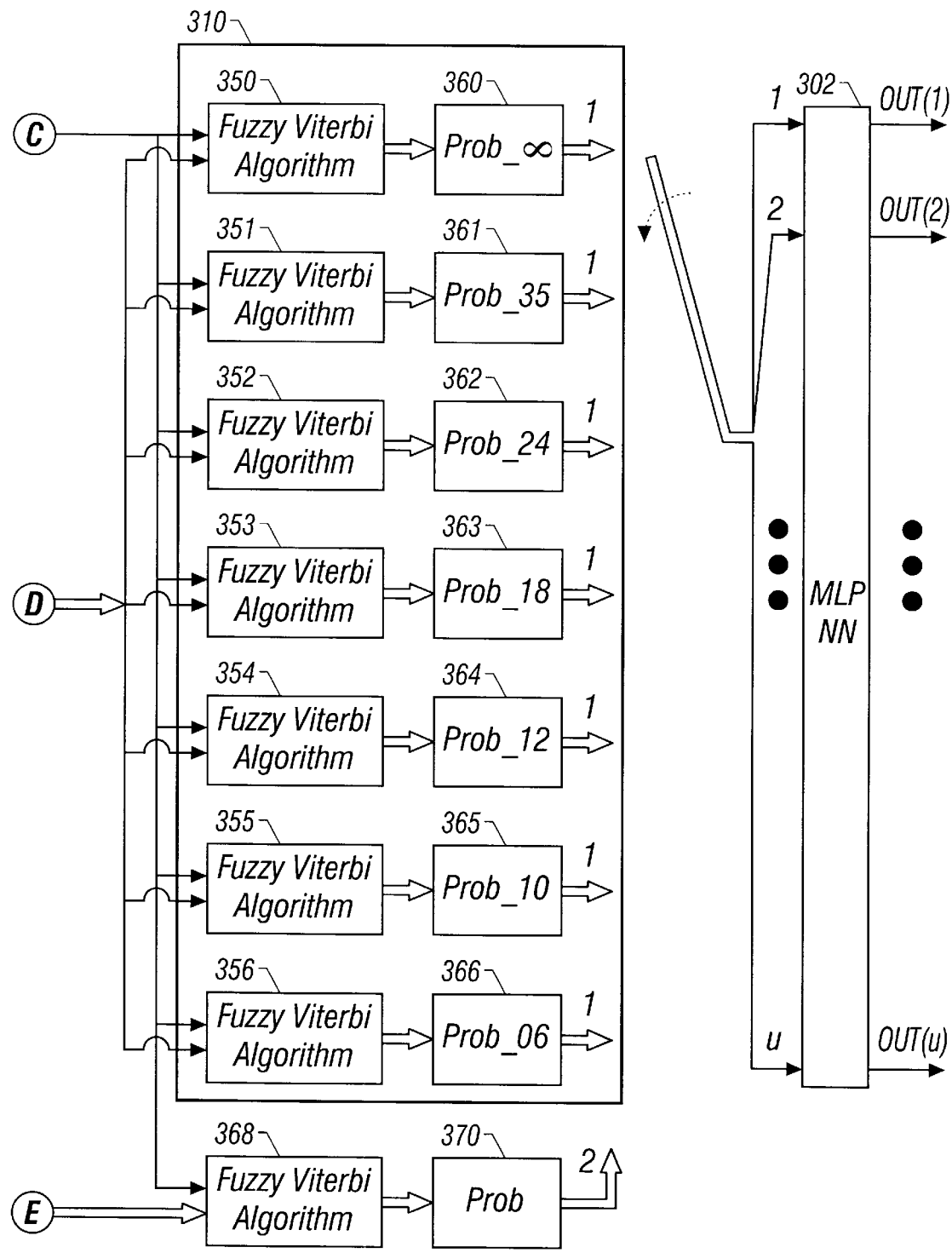
Figure 3D:
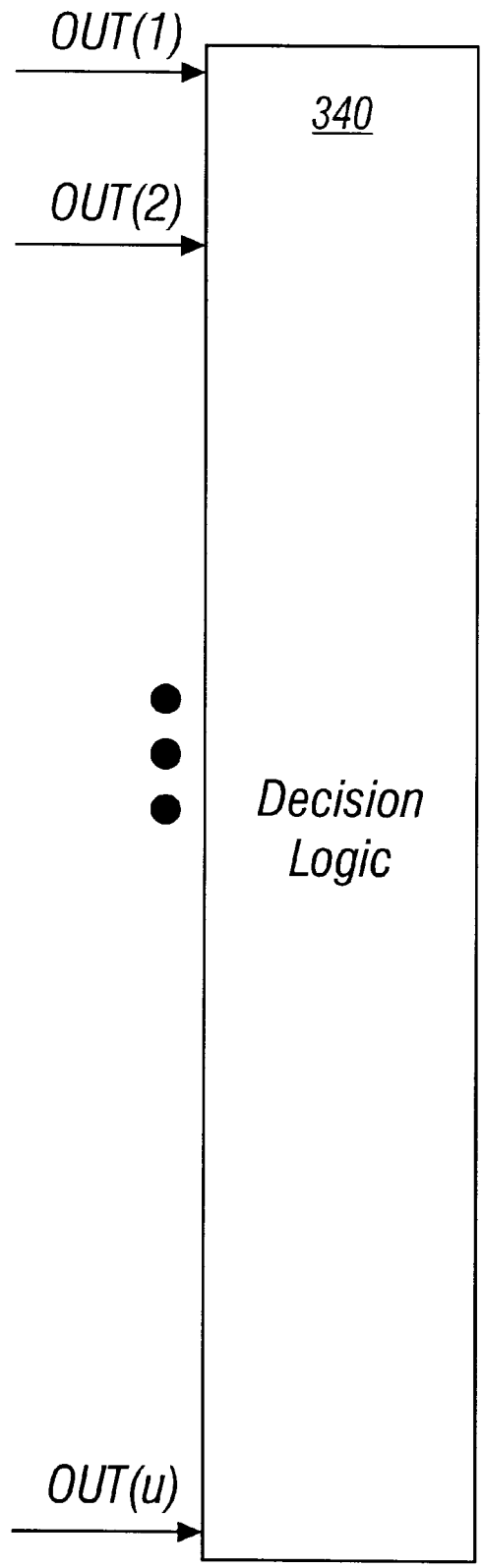

This description uses the following abbreviations:

FMQ—Fuzzy Matrix Quantization
FVQ—Fuzzy Vector Quantization
MQ—Matrix Quantization
HMM—Hidden Markov Model
λ—a HMM process
Pr(O|λ)—Probability of model/process X producing observation O
NN—Neural network
MLP—Multilevel Perceptron neural network
LSP—Line Spectral Pair
dB—decibel
FD—fuzzy distance measure
SNR—Signal to Noise Ratio Referring to an embodiment of a speech recognition system in FIG. 3, speech recognition system 300 combines the classification power of speech classifier neural network 302 and noise signal suppression with temporal distortion, and probability information derived from frames of input acoustic signal 304 with at least one speech preprocessor to classify acoustic signal 304 from a predetermined set of vocabulary words. In preparation for classification, speech recognition system 300 undergoes a training process of designing FMQ 307 codebooks and preclassifier robust FMQ 308 codebook and training u hidden Markov models in preclassifier HMMs 306 and neural network 302. The neural network 302 and speech preprocessors, such as the fuzzy matrix quantizer and hidden markov models/Viterbi algorithm may be implemented as code in a memory for execution by a processor. A data base of u words repeated r times and corrupted by s different levels of acoustic noise is used during the training process, where u corresponds to the vocabulary of speech recognition system 300, and s and r are positive integers, for example, seven and thirty, respectively.

During quantization, a distance measure between predetermined codeword coefficients and acoustic input speech coefficients is used to derive data for use by speech recognition system 300 in classifying the acoustic input signal. The type of coefficients used to represent the codewords and acoustic input signals and the distance measure play an important role in classification accuracy, especially in acoustically noisy environments and in both speaker-independent and speaker-dependent speech recognition systems. Both energy coefficients and spectral frequency coefficients are used to generate a distance measure between an acoustic input signal and a codeword to classify respective speech input words. When the speech word signal component of the acoustic input signal 304 is corrupted by a noise signal, the distance measure using determined energy and frequency coefficients enhances the distinction between respective acoustic input signals by at least partially suppressing the noise signal component of the acoustic input signal. More specifically, words have distinct energies during predetermined time intervals, and, thus, distinctive energies of the acoustic input signal during corresponding intervals of time can be used to increase classification accuracy. Furthermore, during an interval of time, acoustic noise signal energy is relatively constant in the time domain while the speech word signal energy typically varies more substantially during the same interval of time. By determining the first derivative or change of the acoustic input signal energy over different intervals of time, corruption by a noise signal with relatively constant energy may be significantly eliminated to enhance the distinction between respective acoustic input signal words. Furthermore, the second derivative of the energy or change of the acoustic input signal first derivative of the energy during the same intervals of time may be used to further enhance the distinction between respective acoustic input signal words.

Additionally, a distance measure between the acoustic input signal spectral frequencies and codeword spectral frequencies may be manipulated to compensate for noise corruption. More specifically, compensation error factors may be computed using an error power spectrum of a speech input signal and a predicted speech input signal. The noise to be compensated for may be known, for example, from knowledge of a specific operating environment or may be dynamically determined. The error factors are used to appropriately shift and weight each of the ith frequencies of input signal and codeword frequencies to compensate for noise corruption. Thus, hen the energy coefficients are combined with other signal parametric coefficients, such as line spectral pair coefficients, with or without noise compensation, recognition accuracy may be enhanced.

Referring to FIG. 3, FMQ 308, with a single codebook for u words, is a front end to HMMs 306, and speech recognition system 300 uses an observation sequence $O_n$ of probability mass vectors from FMQ 308 based on the coefficients used to represent codewords and acoustic input signal 304 to respectively train the HMMs 306. Signal modeling based on HMMs 306 can be considered as a technique that extends conventional stationary spectral analysis principles to the analysis of the quantized time-varying acoustic input signal 304. The time-varying quantized properties of acoustic input signal 304 are used by processes $\lambda_n$ of HMMs 306 and Viterbi algorithm 310 to describe acoustic input signal 304 probabilistically. Maximum likelihood probabilities $Pr(O_n|\lambda_n)$ 360–366 calculated at seven respective SNR levels with a Viterbi algorithm serve respectively as input data to respective nodes of MLP neural network 302.

Speech recognition system 300 is designed to classify acoustic input signal 304 word as one of u predetermined vocabulary words. Initially during training, for each of u vocabulary words, u codebooks 309 in FMQ 307 are respectively designed using the nth word of u vocabulary words repeated r times at s SNR levels. Thus, a total training database has u times r times s (urs) entries. Each of the usr words in the database is input to speech recognition system 300 as acoustic input signal 304 and preprocessed by preprocess operation 312 which, for example, band limits acoustic signal 304 to 3.6 kHz and samples acoustic signal 304 at 8 ksamples/sec with a resolution of 16 bits per sample. During speech recognition, when continuous speech is produced, voice activity detector (VAD) 314 effectively defines end points of input words for IWSR.

Figure 4:
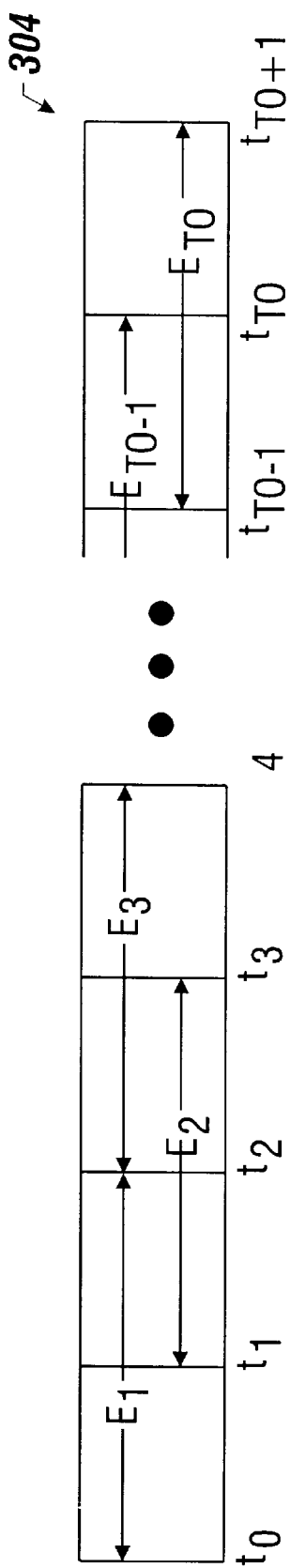
FIG. 4 illustrates a sequence of frames defining a speech input signal.

Referring to FIGS. 3 and 4, acoustic input signal 304 is represented by TO 20 msec frames of sampled data with a 10 msec overlap between frames. Each frame of acoustic input signal 304 is processed in energy coefficients operation 315 to determine the respective energy, $E_y$, in the yth frame, y=1, 2, ..., TO, during the 20 msec time interval of $t_q$ to $t_{q+2}$, where $E_y$ is defined as:

$$E_y = \sum_{n=0}^{N} |(s(n)_y)|^2,$$

where $s(n)_y$ is the sampled acoustic input signal of the yth frame, and N equals the number of samples in the yth frame defined by the time interval $t_q$ to $t_{q+2}$, which equals 160 when acoustic input signal 304 is sampled at 8 ksamples/sec.

As discussed above, acoustic input signal 304 represents a speech signal word which may be corrupted by an acoustic noise signal. Because the energy "signature" of each speech signal word is typically distinct, the energy, $E_y$, in each frame of the acoustic input signal 304 may be used during training to develop codeword coefficients in, for example, a quantizer such as FMQ 308, and be used during recognition to compare to corresponding codeword coefficients. To decrease the amount of data used to represent the energy signature of each acoustic input signal 304, $E_y$ for each frame is normalized using the frame of acoustic input signal 304 having the maximum energy, $E_{max}$, i.e.

$$E_{y,norm} = \frac{E_y}{E_{max}}, y = 1, 2, \ldots, TO.$$

To further reduce the amount of data used to represent each acoustic input signal 304 energy signature while maintaining sufficient resolution to distinguish between different speech signal words, the logarithm of $E_{y,norm}$, is determined in energy coefficients operation 315. Log $E_{y,norm}$ for each frame may be used during training and during recognition as a coefficient in the quantization process.

In some environments, such as an automobile environment, noise signals are generally predictable or may be dynamically determined and occupy a low frequency spectral region. In the sampling window defined by the time interval $t_q$ to $t_{q+2}$, the rate of change of the noise signal from frame to frame is small when $t_{q+1}$ minus $t_q$ is relatively small. Additionally, overlapping of successive frames effectively decreases the frame time interval from $t_{q+2}$–$t_q$ to $t_{q+1}$–$t_q$ for purposes of determining frame-to-frame energy changes. Frame times may vary inversely to the noise signal frequency and processing performance. Thus, when acoustic input signal 304 is corrupted by a noise signal, taking the first derivative of each frame of acoustic input signal 304 in energy coefficients operation 315 aids in suppressing the impact of any noise signal. The first derivative of the energy, $E'_y$, of each frame of the input signal is in one embodiment a change in the energy of acoustic input signal 304 from one frame relative to a preceding frame and is defined as, $$E'_y = (E_y)' = E_y - E_{y-1},$$

where $E_y$ is the original energy of the yth frame, y=1, 2, ..., TO, and $E_{y-1}$ is the original energy of the preceding (y-1)th frame. For y=1, $E_{y-1}$ is zero. As with the original acoustic input signal 304, the first derivative energy data, $E'_y$, may be reduced for acoustic input signal 304 while maintaining sufficient resolution by utilizing the first derivative of $E_{y,norm}$ to generate normalized first derivative energy coefficients, $E'_{y,norm}$. Furthermore, the data may be reduced in energy coefficients operation 315 further by determining the logarithm of $E'_{y,norm}$, and also using log $E'_{y,norm}$ as a coefficient in the quantization process to suppress the impact of low frequency noise.

Additionally, in energy coefficients operation 315, the second derivative of the energy, $E''_y$, in each frame of acoustic input signal 304 is also determined and defined as, $$E''_y = (E'_y)' = E'_y - E'_{y-1},$$

where $E'_y$ is the first derivative of the original energy $E_y$ of the yth frame, y=1, 2,..., TO, and $E_{y-1}$ is the first derivative of energy of the preceding (y-1)th frame. For y=1, $E'_y$ is zero. As with the original acoustic input signal 304 and the first derivative energy data, the second derivative energy data, $E''_y$, y=1, 2,..., TO, may be reduced for acoustic input signal 304 while maintaining sufficient resolution by utilizing the first derivative of the normalized first derivative energy coefficient, $E'_{y,norm}$ to generate normalized second derivative energy coefficients, $E''_{y,norm}$. Furthermore, the data may again be reduced further by determining the logarithm of log $E''_{y,norm}$ and log $E''_{y,norm}$ may also be used as a coefficient in the quantization process.

Referring to FIG. 3, a P order linear predictive code (LPC) analysis is performed in LPC operation 316 on each of the TO 20 msec frames of acoustic input signal 304 (FIG. 4) with a 10 msec overlap between frames to compute the LPC coefficients for the acoustic signal 304 frame using, for example, the Burg algorithm. P may vary depending on trade offs between desired resolution and processing speed and in this embodiment, P is assumed to be in the range of ten to sixteen. Frame times may vary and are, in general, chosen to represent an approximately static vocal tract period in a range of, for example, 10–30 msec. The training process follows the path through path position 1-1', to LSP operation 317 where line spectral pair frequencies are derived in a well-known manner from the respective LPC coefficients. LSP__(SNR) operations 318, 320, 322, 324, 326, 328, and 330 indicate that line spectral pair frequencies (coefficients) are generated by LSP operation 317 for each acoustic signal 304 frame for all seven SNR levels from the LPC coefficients. Additionally, during training, the energy coefficients are generated in energy coefficients operation 315 for each frame of each word at each SNR level.

In the embodiment of FIG. 3, the respective SNR levels used to train speech recognition system 300 are clean speech (∞), 35 dB, 25 dB, 24 dB, 18 dB, 12 dB, and 6 dB to model various noises in an automotive environment. Other SNR values may be chosen to model other speech environments or more extensively model the automotive environment. Speech recognition system 300 is designed for robustness by training with multiple acoustic noise SNR corruption levels to better model realistic acoustic signal 304 input conditions where speech is corrupted by acoustic noise.

The LSP representations of acoustic signal 304 are used to define a spectral envelope because they provide a robust representation of the speech short-term magnitude spectral envelope of acoustic signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1300 Hz. This is particularly useful when speech is corrupted by narrow band noise in which case only a subset of LSP parameters are affected by the input noise.

In general, given a short segment of acoustic signal 304 and the corresponding all-pole filter H(z)=G/A(z), where A(z) is the inverse filter given by $$A(z)=1+a_1z^{-1}+a_2z^{-2}+\ldots+a_Pz^{-P}$$

where P is the order of the predictor and $\{a_i\}$ are the prediction coefficients, the LSPs are defined by decomposing the inverse filter polynomial into two polynomials, $$P(z)=A(z)+z^{-(P+1)}A(z-1),$$

and $$Q(z)=A(z)-z^{-(P-1)}A(z-1),$$

where P(z) is a symmetric polynomial, Q(z) is an antisymmetric polynomial and $$A(z) = \frac{1}{2}[P(z)+Q(z)].$$

The roots of the polynomials P(z) and Q(z) define the LSP frequencies (coefficients).

In different environments, speech is corrupted by acoustic noise of varying frequency. However, in some environments, the frequency bands occupied by noise signals can be generally predictable. For example, in an automotive environment, a large portion of acoustic noise energy is concentrated in the low frequency 300–400 Hz range which can particularly corrupt male voices. Additionally, car noise energy is generally predictable at different operating speeds. Thus, the peak of the noise spectra in an automotive environment is substantially located in generally predictable low frequencies. The noise spectrum then decreases exponentially as frequencies increase until after about 4 kHz the acoustic noise energy is very low. Through analyzing the effect of the automotive noise on LSP speech parameters, we found that the power of the car noise affects low order LSP parameters more than the high order LSP parameters. Therefore, a robust LSP distance measure $d(f, \hat{f})$, computed by FMQ 307 and FMQ 308, between LSP coefficients of vector f formed from LSP coefficients in operations LSP__(SNR) operations 318–332 from an input word, and a LSP coefficients of a reference vector $\hat{f}$ which is a matrix centroid in FMQ 307 and FMQ 308 is given by:

$$d(f,\hat{f}) = \sum_{i=1}^{G} \alpha_1\left[(f_i - e_i^{\beta_1} - \hat{f}_i)\right]^2 + \sum_{i=G+1}^{P} \alpha_2\left[(f_i - \hat{f}_i)e_i^{\beta_2}\right]^2$$

where $f_i$ and $\hat{f}_i$ are the ith LSP in the test and reference vector, respectively. The constants $\alpha_1$, $\alpha_2$, $\beta_1$ and $\beta_2$ are experimentally determined to minimize quantization error. For the automotive noise environment studied, $\alpha_1$ is set to 1.6, $\alpha_2$ is set to 0.68, $\beta_1$ is set to 0.5, and $\beta_2$ is set to 0.25. When noise amplitude is large, the quantization error will also be large. Thus, when speech is corrupted by car noise, the frequency shift for the first G order LSP coefficients can compensate the car noise affect at low LSP frequencies and the weight can compensate the G+1 to P order coefficients at high LSP frequencies to reduce quantization error. Reducing quantization error improves the recognition accuracy of speech recognition system 300.

The error $e_i$ is the weight and frequency shift for the ith LSP and is given by the LPC error power spectrum at the different test LSP frequencies. Acoustic input signal 304 is sampled at a rate of n samples per second, and one frame of acoustic input signal 304 is represented by speech input signal s(n) and an error, e(n), between the speech input signal s(n) and a predicted speech input signal, $\hat{s}(n)$, as defined by $$e(n) = s(n) - \hat{s}(n) = s(n) - \sum_{k=i}^{P} \alpha_k s(n-k)$$

where $\alpha_k$ are prediction coefficients and are selected to minimize the total squared prediction error defined by the energy E(n) of e(n):

$$E_n = \sum_m e^2(m) = \sum_m [s_n(m) - \hat{s}_n(m)]^2,$$

and can be found by setting $\delta\Sigma_n/\delta\alpha_i=0$, for i=1, 2, ..., P.

A discrete Fourier transform of e(n) yields: $|E(e^{j2\pi fi})|^2$, i=1,2, ..., P which is the spectrum associated with the speech input signal represented by P order LSPs as a function of LSP frequencies. Thus, the error $e_i$ is defined as:

$$e_i=|E(e^{j2\pi fi})|^2,$$

where $f_i$ is the ith LSP frequency of the speech input signal.

The frequencies that are shifted are the frequencies at which noise energy is primarily concentrated. Noise energy concentrations may be dynamically detected using a noise detector (not shown) or may be predetermined based on knowledge of a known user environment. Additionally, in some operating environments, such as in a car, noise changes according to traveling speed. The speed can be detected and a database of predicted noise energy frequency concentration may be accessed by a processor (not shown) to dynamically adjust the error compensation of the robust distance measure.

Each of the u codebooks 309 for a given vocabulary word is designed by developing a matrix entry from each corresponding input word $W_{nkm}$, n=1, 2, ... u, k=1, 2, ..., s, m=1, 2, ..., r, from the database of usr words. The sr matrix entries for each of the u words at each of the s SNR levels are processed to optimally cluster each of the sr entries for each of the u codebooks 309 into C cells. A centroid is computed for each of the C cells for each of the u codebooks 309 for minimum quantization distortion using, for example, a Fuzzy C-algorithm or a fuzzy Linde-Buzo-Gray (LBG) algorithm as illustratively discussed in chapter 3, section 3.3.4 of the Doctor of Philosophy thesis of Lin Cong entitled "A Study of Robust IWSR Systems" and located in the John Rylands University Library of Manchester in Manchester, England, which thesis is hereby incorporated by reference in its entirety, and further illustratively discussed in C. S. Xydeas and Lin Cong, "Robust Speech Recognition Using Fuzzy Matrix Quantisation, Neural Networks and Hidden Markov Models", pp. 1587–1590, EUSIPCO-96, Vol. 1, September, 1996, which is also incorporated by reference in its entirety. Thus, u matrix codebooks (MCBn) 309 in FMQ 307 are formed.

Each of the u codebooks 309 is used to design a single codebook 311 by combining the C centroids of each of the u codebooks 309 into u times C centroids of the single codebook 311. The individual centroids are preferably unaltered after combining. Cu may be chosen to accommodate available speech recognition system 300 resources and is, for example, equal to the training vocabulary word size times 16.

FMQ 307 utilizes interframe information related to the "evolution" of the speech short-term spectral envelopes input signal energy coefficients of acoustic signal 304 by operating on N consecutive, overlapping speech frames of acoustic signal 304 (FIG. 4). Each frame is represented by P LSP coefficients, and, thus, an N frames acoustic input signal segment provides a P×N matrix of LSP coefficients. Each frame is also represented by three energy coefficients, log $E_{y,norm}$, log $E'_{y,norm}$, and log $E''_{y,norm}$, and, thus, the N frame's acoustic input signal segment provides an additional 3×N matrix of energy coefficients. Each matrix entry for an acoustic signal 304 input word $W_{nkm}$ may be designed using a training set of TO input signal spectral and energy coefficient vectors respectively derived from each of TO frames of each acoustic signal 304 word $W_{nkm}$, which result in a set X={$x_1$, $x_2$, ..., $x_T$} of T, (P+3)×N matrices for each acoustic signal 304 word $W_{nkm}$, where T=int(TO/N)

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \\ x_{P+1,1}^k & x_{P+1,2}^k & \cdots & x_{P+1,N}^k \\ x_{P+2,1}^k & x_{P+2,2}^k & \cdots & x_{P+2,N}^k \\ x_{P+3,1}^k & x_{P+3,2}^k & \cdots & x_{P+3,N}^k \end{bmatrix} = [\bar{x}_k(1), \bar{x}_k(2), \ldots, \bar{x}_k(N)],$$

where the $\bar{x}k(j)=[x_{1j}{}^k x_{2j}{}^k \ldots x_{(P+3)j}{}^k]'$, j=1, 2, ..., N, k=1, 2, ..., T for each word $W_{nkm}$ is grouped by word to form the rs entries in the corresponding nth FMQ 309 codebook. The first P entries of the ith column vector are the first through Pth LSP spectral coefficients, respectively, and the last three coefficients are log $E_{y,norm}$, log $E'_{y,norm}$, and log $E''_{y,norm}$, respectively, for the jth frame. The $\bar{x}k(j)$ for each word entry in a codebook is processed using, for example, the LBG algorithm, to yield a C-cell partitioning of the matrix space for each codebook and V-matrix entries containing C $v_i$, i=1,2, ..., C, (P+3)×N, codeword matrices $$v_i = \begin{bmatrix} v_{11}^i & v_{12}^i & \cdots & v_{1N}^k \\ v_{21}^i & v_{22}^i & \cdots & v_{2N}^k \\ \cdots & \cdots & \cdots & \cdots \\ v_{P1}^i & v_{P2}^i & \cdots & v_{PN}^i \\ v_{P+1,1}^i & v_{P+1,2}^i & \cdots & v_{P+1,N}^i \\ v_{P+2,1}^i & v_{P+2,2}^i & \cdots & v_{P+2,N}^i \\ v_{P+3,1}^i & v_{P+3,2}^i & \cdots & v_{P+3,N}^i \end{bmatrix} = [\bar{v}_i(1), \bar{v}_i(2), \ldots, \bar{v}_i(N)],$$

where $\bar{v}i(j)=[v_{1j}{}^i v_{2j}{}^i \ldots v_{(P+3)}{}^i]'$, j=1, 2, ..., N.

Each of the C codeword matrices $v_i$ for each of the u codebooks 309 are combined as described above to form the single codebook 311 having C times u codeword matrices $v_i$, i=1, 2, ..., Cu, with C codewords per vocabulary word.

Continuing the training process of speech recognition system 300, each of the training word $W_{nkm}$ entries in the urs training word database are provided as a respective training acoustic input signal 304 to the single codebook 311. Each training acoustic input signal 304 is preprocessed by preprocess operation 312, and LPC coefficients are determined in LPC operation 316 as described above. Each of the LPC coefficients are converted into P respective line spectral pair frequencies by LSP operation 317. The energy coefficients log $E_{y,norm}$, log $E'_{y,norm}$, and log $E''_{y,norm}$ are derived in energy coefficients operation 315 from each frame of acoustic input signal 304. Each of the training words $W_{nkm}$ is represented by a respective set of the TO speech spectral vectors for each frame of each acoustic signal 304 word $W_{nkm}$, which result in the set X={$x_1$,$x_2$, ..., $x_T$} of T, P+3×N matrices for each acoustic signal 304 word $W_{nkm}$, where T=int(TO/N).

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \\ x_{P+1,1}^k & x_{P+1,2}^k & \cdots & x_{P+1,N}^k \\ x_{P+2,1}^k & x_{P+2,2}^k & \cdots & x_{P+2,N}^k \\ x_{P+3,1}^k & x_{P+3,2}^k & \cdots & x_{P+3,N}^k \end{bmatrix} = [\overline{x}_k(1), \overline{x}_k(2), \ldots, \overline{x}_k(N)],$$

A non-fuzzy matrix quantization of X can be described by a Cu×T classification matrix U of elements:

$$u_{ik} = \begin{cases} 0, & x_k \notin A_i \quad i = 1, 2, \ldots, Cu \\ 1, & x_k \notin A_i \quad k = 1, 2, \ldots, T, \end{cases}$$

where $A_i$ is the ith cell with centroid $v_i$.

Furthermore, the elements of this single codebook MQ matrix satisfy the following two conditions:

a)

$$\sum_{i=1}^{Cu} u_{ik} = 1,$$

i.e., only one element in a column is equal to one; the remaining elements are zero. This implies that each matrix $x_k$ is "quantized" to only one centroid of the matrix space.

b)

$$\sum_{k=1}^{T} u_{ik} > 0;$$

this ensures that there is no empty cell in this Cu-class partitioning of the matrix space.

The columns $O_j$, j=1,2, . . . , T, of the classification matrix U "map" effectively an input matrix $x_j$ into a vector $O_j = \{u_{1j}, u_{2j}, \ldots, u_{Cuj}\}$ with all zero values except one element $u_{ij}=1$ indicating that the distance $$J(O_j, V) = \sum_{i=1}^{Cu} u_{ij} d(x_j, v_i)$$

between $x_j$ and the ith cell is minimized. Note that each of the columns of relative closeness indices $O_j$, j=1,2, . . . , T represents the acoustic input signal 304 at different instances in time. $d(x_j, v_i)$ is the distance measure $$d(x_j, v_i) = \frac{1}{N} \sum_{n=1}^{N} d(\overline{x}_j(n), \overline{v}_i(n))$$

and, for example, the distance measure $$d(\overline{x}_j(n), \overline{v}_i(n)) = \sum_{m=1}^{P+3} (x_{mn}^j - v_{mn}^i)^2.$$

This distance measure is the distance between the jth column vector $X_j$ and $v_i$, which is the centroid of the ith cell. As described above, for additional robustness, $$d(\overline{x}_j(n), \overline{v}_i(n)) = \sum_{m=1}^{G} \alpha_1 \left[(x_{mn}^j - e_1^{B_1} - v_{mn}^i)\right]^2 +$$

$$\sum_{m=G+1}^{P} \alpha_2 \left[(x_{mn}^j - v_{mn}^i) e_i^{B_2}\right]^2 + \sum_{m=P+1}^{P+3} (\alpha_3 (x_{mn}^j - v_{mn}^i))^2.$$

The constant $\alpha_3$ is experimentally determined and is, for example, 100 which increases the effect of the energy coefficients, especially when using normalized, logarithmic energy coefficients. Note that for a non-fuzzy MQ codebook, an optimum partition of the matrix space of each of the u codebooks 309 into the C cells before combining the u codebooks 309 into single codebook 311 ensures that $$J(U, V) = \sum_{j=1}^{T} \sum_{i=1}^{Cu} u_{ij} d(x_j, v_i)$$

is minimized. Different distance measures utilize different quantization mechanisms for computing the "centroid" matrices $v_i$. Using the robust distance measure with $e_i$ shifting and weighting and using the energy coefficients increases quantization accuracy.

The fuzzy matrix quantization of each of the training words $W_{nkm}$, using the single codebook 311, is described by a Cu×T fuzzy classification matrix $U_F$ with elements $U_{ik} \in [0,1]$, i=1,2, . . . ,Cu, k=1,2, . . . , T. The value of $u_{ik}$, $0 \leq u_{ik} \leq 1$, indicates the degree of fuzziness of the kth input matrix $x_k$ to the ith partitioning cell which is represented by the centroid $v_i$. The two conditions are also satisfied:

$$\sum_{i=1}^{Cu} u_{ik} = 1 \text{ and } \sum_{k=1}^{T} u_{ik} > 0$$

In this case, $u_{ik}$ is derived as:

$$u_{ik} = \frac{1}{\sum_{j=1}^{Cu} \left( \frac{d_{ik}(x_k, v_i)}{d_{jk}(x_k, v_j)} \right)^{\frac{1}{(F-1)}}}.$$

where the constant F influences the degree of fuzziness. $d_{ik}(x_k, v_j)$ are the average distance measures as defined with reference to the MQ design.

The columns of probability mass vectors $O_j$ of the classification matrix $U_F$ "map" an input matrix $x_j$ into a probability mass vector of indices $O_j = \{u_{1j}, u_{2j}, \ldots, u_{Cuj}\}$ which results in the distance $$J(O_j, V) = \sum_{i=1}^{Cu} u_{ij}^F d(x_j, v_i).$$

When using the robust distance measure, $d(x_j, v_i)$ is the distance measure $$d(x_j, v_i) = \frac{1}{N} \sum_{n=1}^{N} d(\overline{x}_j(n), \overline{v}_i(n)) \text{ and}$$

-continued $$d(\overline{x}_j(n), \overline{v}_i(n)) = \sum_{m=1}^{G} \alpha_1 \left[(x_{mn}^j - e_1^{B_1} - v_{mn}^i)\right]^2 +$$

$$\sum_{m=G+1}^{P} \alpha_2 \left[(x_{mn}^j - v_{mn}^i)e_i^{B_2}\right]^2 + \sum_{m=P+1}^{P+3} \alpha_3 (x_{mn}^j - v_{mn}^i)^2.$$

Furthermore, the overall distance of the Cu entries of FMQ 308 operating on the X matrix set or a acoustic signal 304 word $W_{nkm}$ is $$J(U, V) = \sum_{j=1}^{T} \sum_{i=1}^{Cu} u_{ij}^F d(x_j, v_i).$$

Note that the summation of $O_j$ entries is equal to unity. The largest component of $O_j$ is the one which corresponds to the codeword with the smallest $d(x_j, v_i)$ value. $O_j$ can be interpreted as a probability mass vector relating the input matrix $x_j$ to all $v_i$, i=1,2, . . . , Cu. The total observation sequence $O_n$ of probability mass vectors for each acoustic signal 304 word for one codebook is defined as $O_n=\{O_1, O_2, \ldots, O_T\}$, $O_j=\{u_{1j}, u_{2j}, \ldots, u_{Cuj}\}$.

Equations $$J(U, V) = \sum_{j=1}^{T} \sum_{i=1}^{Cu} u_{ij} d(x_j, v_i) \text{ and}$$

$$J(U, V) = \sum_{j=1}^{T} \sum_{i=1}^{Cu} u_{ij}^F d(x_j, v_i)$$

respectively provide the MQ and FMQ distance and can also be represented by the general distance equation:

$$FD = J(W, V) = \sum_{j=1}^{T} \sum_{i=1}^{Cu} w_{ij} d(x_j, v_i),$$

where $$w_{ij} = \begin{cases} u_{ij} & u_{ij} \in \{0, 1\} \\ u_{ij}^F & u_{ij} \in [0, 1] \end{cases}$$

Fuzzy matrix quantization is further illustratively discussed in Xydeas and Cong, "Robust Speech Recognition in a Car Environment," International Conf. on Digital Signal Processing, Vol. 1, pp. 84–June, 1995, Cyprus, which is herein incorporated by reference in its entirety.

During the training mode of speech recognition system 300, the training input data for the hidden Markov models of classifier HMMs 306 are in one embodiment the observation sequences $O_n$ of probability mass vectors $O_j$ from a classification matrix U. The classification matrix U is generated by FMQ 308 from a fuzzy matrix quantized speech input signal for each of the training words $W_{nkm}$ as described above. HMMs 306 have a respective process $\lambda_n$, n=1, 2, . . . , u, for each of the u words. Each of the respective u vocabulary words for each repetition r and SNR levels s is, in one embodiment, fuzzy matrix quantized to train a corresponding HMM process $\lambda_n$. Each of the observation sequences $O_n$ from FMQ 308 for each of the urs training words train corresponding HMM processes, $\lambda_n$, n=1, 2, . . . , u, i.e. for an nth vocabulary word, an input observation sequence $O_n$ trains only the nth HMM $\lambda_n$. Fuzzy Viterbi algorithm operation 310, described in section 4.3 of L. Cong, "A Study of Robust IWSR Systems" utilizes a respective observation sequence $O_n$ from each of the rs versions of each of the u words and a fuzzy Viterbi algorithm to produce a maximum likelihood probability $Pr(O_n|\lambda_n)$ of the HMM process $\lambda_n$ producing the observation sequence $O_n$. Separate HMMs may be built for males and females, and the number of states of each HMM is set to, for example, five. HMM training is further described in chapter 2 and chapter 4, section 4.3 of L. Cong, "A Study of Robust IWSR Systems".

In one embodiment neural network 302 is a multilayer perceptron type NN. Multilayer networks overcome many of the limitations of single-layer networks. That is, multilayered, hierarchical networks are more powerful because of the nonlinearities and the internal representation generated in the so-called hidden layers. The multiple nodes in the output layer typically correspond to multiple classes in the multi-class pattern recognition problem. In general, an MLP neural network 302 has an ability to partition an input pattern space in a classification problem and to represent relationships between events. Additionally, MLP neural network 302 with multiple layers and sufficient interconnections between nodes ensures an ability to "learn" complex classification boundaries, and implement nonlinear transformations for functional approximation problems. The MLP has G hidden nodes where G is preferably determined empirically based upon the number of u vocabulary words, memory size, and processing capabilities.

The MLP neural network 302 is trained using the maximum likelihood probabilities produced by fuzzy Viterbi algorithm operation 310. The post-classifier MLP neural network 302 accepts this input data and is appropriately designed using the well-known back propagation algorithm. The MLP neural network 302 is trained for the nth vocabulary word, using the back propagation algorithm, with the s SNR values of each of the r single word versions. Multiple fuzzy Viterbi algorithms 350–356 with corresponding maximum likelihood probabilities 360–366 are shown to indicate that MLP neural network 302 is trained using words corrupted by acoustic noise of SNR levels ∞ dB, 35 dB, 24 dB, 18 dB, 12 dB, 10 dB, and 06 dB.

After training the speech recognition system 300, path 2 is selected to initiate an acoustic input signal 304 recognition process. When any acoustic input signal 304 word $W_n$ is spoken by a user, VAD 314 effectively defines end points of input words for IWSR. Speech input signal 304 word $W_n$ is next preprocessed by preprocess operation 312 as described above. Word $W_n$ is sampled at, for example, 8 ksamples/sec, and segmented into TO frames of t seconds each, such as t equal to 20 msec with a 10 msec overlap of each consecutive frame of $W_n$. Energy coefficients operation 315 generates the log $E_{y,norm}$, log $E'_{y,norm}$ and log $E_{y,norm}$, energy coefficients. LPC operation 316 generates P LPC coefficients for each frame of the $W_n$, and LSP operation 332 generates Pth order LSP coefficients from the LPC coefficients as described above.

FMQ 308 utilizes interframe information related to the "evolution" of the speech short-term spectral envelopes of acoustic signal 304 word $W_n$ by operating on N consecutive speech frames of word $W_n$. Each frame is represented by the P order LSP coefficients and the three energy coefficients, and N frames of speech input signal segment of word $W_n$ provide a (P+3)×N matrix of LSP and energy coefficients. Each group of N frames of acoustic signal 304 word $W_n$ is represented by a (P+3)×N matrix of P LSP coefficients and three energy coefficients, where T=int(TO/N). Word $W_n$ may, thus, be represented as a matrix $X_{WN}=\{x_1,x_2,\ldots,x_T\}$ of T, (P+3)×N matrices for each acoustic signal 304 word $W_{nkm}$, where each of the T, (P+3)×N matrices is defined as:

$$x_k = \begin{bmatrix} x_{11}^k & x_{12}^k & \cdots & x_{1N}^k \\ x_{21}^k & x_{22}^k & \cdots & x_{2N}^k \\ \cdots & \cdots & \cdots & \cdots \\ x_{P1}^k & x_{P2}^k & \cdots & x_{PN}^k \\ x_{P+1,1}^k & x_{P+1,2}^k & \cdots & x_{P+1,N}^k \\ x_{P+2,1}^k & x_{P+2,2}^k & \cdots & x_{P+2,N}^k \\ x_{P+3,1}^k & x_{P+3,2}^k & \cdots & x_{P+3,N}^k \end{bmatrix} = [\bar{x}_k(1), \bar{x}_k(2), \ldots, \bar{x}_k(N)],$$

where $\bar{x}k(j)=[x_{1j}{}^k x_{2j}{}^k \ldots x_{(P+3)j}{}^k]'$, $j=1,2,\ldots,N$, $k=1,2,\ldots,T$.

FMQ 308 fuzzy matrix quantizes the matrix representation $X_{WN}=\hat{x}k(j)$ of word $W_n$ with the designed Cu codeword entries of the single codebook 311. Single codebook FMQ 308 produces the fuzzy distance measure FD and yields an observation sequence $O_n$ of T probability mass vectors $O_j$, $j=1, 2, \ldots,$ Cu. Observation sequence $O_n$ is used as input data by a fuzzy Viterbi algorithm 368 operating on each of the HMM $\lambda_n$ processes of HMMs 306. The u outputs of the fuzzy Viterbi algorithm 310 are the respective maximum likelihood probability Pr' $(O_n|\lambda_n)$ measures that each of the $\lambda_n$ processes corresponds to $W_n$.

These u respective maximum likelihood probability Pr' $(O_n|\lambda_n)$ measures are the input data for u input nodes of MLP neural network 302. The MLP neural network 302 has u outputs $\{OUT(1), OUT(2), \ldots, OUT(u)\}$ from output nodes which assume classification values in the region 0<OUT(j)<1. Decision logic 340 classifies $W_n$ as the nth vocabulary word if OUT(i)=max$\{OUT(1), OUT(2), \ldots, OUT(u)\}$. The fuzzy distance measure FD is generated as described above using the robust distance measure. Accordingly, because the robust distance measure compensates for, for example, noise, speech recognition system 300 recognition accuracy is improved.

Using the discrete time samples of acoustic input signal 304, the TIDIGITS speech database from Texas Instruments, Inc., and the NOSEX_92 database for car noise, recognition accuracy has been experimentally obtained as shown in Table 1.

TABLE 1

| | Car noise level | | | | | |
|---|---|---|---|---|---|---|
| Speech recognition system 300 | 35 dB | 24 dB | 20 dB | 15 dB | 10 dB | 05 dB |
| Speaker-dependent with energy coefficients recognition accuracy | 100% | 100% | 99% | 96% | 92% | 77% |
| Speaker-dependent without energy coefficients recognition accuracy | 100% | 99% | 99% | 94% | 89% | 74% |
| Speaker-independent with energy coefficients recognition accuracy | 96.61% | N/A | 93.21% | 90% | 79.03% | N/A |

The data in Table 1 illustrates the improvement of using energy coefficients, log $E_{y,norm}$, log $E'_{y,norm}$, and log $E''_{y,norm}$ during gender dependent testing. These results were obtained using discrete data and accuracy may be improved if continuous time algorithms are used.

While the invention has been described with respect to the embodiments and variations set forth above, these embodiments and variations are illustrative and the invention is not to be considered limited in scope to these embodiments and variations. For example, the embodiment of speech recognition system 300 can be further simplified to a robust HMM based IWSR structure by removing the MLP post-classifier from the system FMQ/HMM/MLP shown in FIG. 3 to form a FMQ/HMM speech recognition system 300. Furthermore, other speech recognition systems may utilize the energy coefficients and robust frequency shifting and weighting distance measure such as the speech recognition systems described in U.S. Patent Application by Safdar M. Asghar and Lin Cong, having U.S. patent application Ser. No. 08/883,978 on Jun. 27, 1997, and entitled Adaptive Speech Recognition With Selective Input Data To A Speech Classifier, which is hereby incorporated by reference in its entirety. Additionally, systems having, for example, a quantizer, such as a vector quantizer (VQ), fuzzy VQ, MQ, and/or FMQ, alone or as a front end to one or more speech classifiers such as hidden Markov models and/or a neural network, such as multilevel perceptron neural network, may utilize the robust line spectral pair distance measure to classify speech input signals. Also, it will be recognized that continuous time data and continuous time algorithms may be used in substitution of the discrete time data and discrete time algorithms, respectively. Using continuous time methods will generally increase processing requirements. Accordingly, various other embodiments and modifications and improvements not described herein may be within the spirit and scope of the present invention, as defined by the following claims.

What is claimed is:

1. A speech recognition system comprising:
   a line spectral pair frequency coefficient generator;
   an energy coefficients generator; and
   a first speech classifier capable of using Nth order vectors to generate first speech classification output data for classifying a speech input signal as recognized speech, wherein the speech input signal is represented by a number of frames with each frame represented by one of the Nth order vectors, wherein components of each Nth order vector include respective line spectral pair frequency coefficients for P orders generated by the line spectral pair frequency coefficient generator, a first energy coefficient generated by the energy coefficients generator and representing original energy of the speech input signal for the respective frame, and a second energy coefficient generated by the energy coefficients generator and representing a first derivative of the original energy of the speech input signal for the respective frame, wherein N and P are integers.

2. The speech recognition system of claim 1 wherein each frame is further represented by a third energy coefficient representing a second derivative of the original energy of the speech input signal for the respective frame.

3. The speech recognition system of claim 1 wherein the first energy coefficient representing the original energy, $E_y$, of the speech input signal for the respective yth frame is defined as:

$$E_y = \sum_{n=0}^{N} |((s(n))_y)|^2;$$

wherein $s(n)_y$ is a discrete time representation of the speech input signal in the yth frame, N represents the number of samples of the speech input signal in the yth frame, and TO is an integer representing the total number of frames representing the speech input signal; and wherein the second energy coefficient representing the energy, $E'_y$, in the first derivative of $E_y$ for the respective yth frame is defined as:

$$E'_y = (E_y)' = E_y - E_{y-1};$$

wherein $E_{y-1}$ is the original energy in the frame of the speech input signal preceding the yth frame.

4. The speech recognition system of claim 1 wherein the first and second energy coefficients are normalized with respect to energy in a frame of the speech input signal having a maximum energy with respect to the remaining frames.

5. The speech recognition system of claim 4 wherein the normalized first and second energy coefficients are further represented logarithmically.

6. The speech recognition system of claim 1 wherein each frame is further represented by a third energy coefficient representing a second derivative, $E''_y$, of the speech input signal original energy for the respective frame and is defined as:

$$E''_y = (E'_y)' = E'_{y-1};$$

wherein $E'_{y-1}$ represents the first derivative of the energy in the frame preceding the yth frame.

7. The speech recognition system of claim 1 further comprising:

a quantizer for determining respective distance measures for each respective frame of the speech input signal between the first G line spectral pair frequencies of the speech input signal and G corresponding order line spectral pair frequencies of a plurality of respective reference vectors, wherein the distance measure for an ith line spectral pair frequency and an ith reference speech signal line spectral pair frequency, for each of i=1 to G line spectral pair frequencies, is proportional to (i) a difference between the ith line spectral pair frequencies and the ith reference speech signal line spectral pair frequencies and (ii) a shift of the difference by an ith frequency shifting factor to at least partially compensate for frequency shifting of the ith speech input signal line spectral pair frequency by speech noise, wherein G is greater than or equal to one and less than or equal to P.

8. The speech recognition system of claim 7 wherein the quantizer is for further determining respective distance measures between ith speech input signal line spectral pair frequencies and the ith reference speech signal line spectral pair frequencies of the reference vectors, wherein the respective distance measures, for i=G+1 to P, are derived from (i) a difference between the ith speech input signal line spectral pair frequencies of each reference vector and the ith reference speech signal line spectral pair frequency and (ii) a weighting of the respective differences by an ith frequency weighting factor.

9. The speech recognition system of claim 8 wherein the quantizer is for further determining a distance measure, $d(f, \hat{f})$, between the speech input signal, f, and each of the reference speech signals, $\hat{f}$, $d(f, \hat{f})$ is defined by:

$$d(f, \hat{f}) = \sum_{i=1}^{G} \alpha_1 \{(f_i - e_i^{\beta_1} - \hat{f}_i)\}^2 + \sum_{i=G+1}^{P} \alpha_2 \{(f_i - \hat{f}_i)e_i^{\beta_2}\}^2 + \sum_{i=P+1}^{P+3} (\alpha_3(E_i - \hat{E}_i))^2;$$

wherein $f_i$ and $\hat{f}_i$ are the ith line spectral pair frequencies in the speech input signal and the reference speech signal, respectively, $E_i$ and $\hat{E}_i$ are the ith energy coefficients, the constants $\alpha_1$, $\alpha_2$, $\alpha_3$, $\beta_1$, and $\beta_2$ are set to substantially minimum quantization error, and $e_i$ is the error power spectrum of the speech input signal and a predicted speech input signal at the ith line spectral pair frequency of the speech input signal.

10. The speech recognition system of claim 9 therein the i=1 to G line spectral pair frequencies are in the 0 to 400 Hz range.

11. The speech recognition system of claim 9 wherein $\alpha_1$ is set to 1.6, $\alpha_2$ is set to 0.68, $\beta_1$ is set to 0.5, and $\beta_2$ is set to 0.25.

12. The speech recognition system of claim 7 wherein the ith frequency shifting factor is proportional to a power spectrum of a linear prediction error at the ith line spectral pair frequency.

13. The speech recognition system of claim 7 wherein the quantizer includes a codebook having C codewords, wherein C is an integer and each codeword is comprised of a set of reference vectors wherein the first speech classification output data is based on the distance measures, the speech recognition system further comprising:

a second speech classifier to receive the first speech classification output data based on the distance measures and to generate second speech classification output data to classify the speech input signal as one of u vocabulary words, wherein u is an integer.

14. The speech recognition system of claim 13 wherein the quantizer is a single codebook quantizer having C times u codewords representing a vocabulary of u words.

15. The speech recognition system of claim 13 further comprising:

a third speech classifier to receive the second speech classification output data from the second speech classifier and classify the speech input signal as one of the u vocabulary words.

16. The speech recognition system of claim 13 wherein the second speech classifier is a neural network.

17. The speech recognition system of claim 13 wherein the quantizer is a fuzzy matrix quantizer further for generating respective fuzzy distance measures between the respective speech input signal and reference speech signal P line spectral pair frequencies and corresponding energy coefficients using the corresponding generated distance measures; and wherein the second speech classifier includes a neural network and the output data is a fuzzy distance measure proportional to a combination of the generated fuzzy distance measures.

18. The speech recognition system of claim 17 wherein the quantizer is a fuzzy matrix quantizer further for generating an observation sequence of indices indicating the relative closeness between the respective speech input signal and reference speech signal P line spectral pair frequencies and corresponding energy coefficients; and wherein the second speech classifier includes u hidden Markov models and a fuzzy Viterbi algorithm module for determining a respective probability for each of the u hidden Markov models that the respective hidden Markov model produced the observation sequence.

19. The speech recognition system of claim 1 further comprising a computer system having a memory to store the speech processing module and a processor coupled to the memory for executing the speech processing module.

20. An apparatus comprising:

means for generating P order line spectral pair frequencies for an acoustic input signal;

means for determining a difference, for i=1 to G, between the ith line spectral pair frequency and an ith line spectral frequency of a reference acoustic signal;

means for shifting the difference by an ith frequency shifting factor, for i=1 to G, to at least partially compensate for frequency shifting of the ith acoustic input signal line spectral pair frequency by acoustic noise;

means for determining a difference, for i=G +1 to P, between ith acoustic input signal line spectral pair frequency and the ith reference acoustic signal line spectral pair frequency;

means for weighting of the difference by an ith frequency weighting factor, for i=G+1 to P, wherein ith frequency shifting and weighting factor is the error power spectrum of the acoustic input signal and a predicted acoustic input signal at the ith line spectral pair frequency of the acoustic input signal;

means for determining an energy of the acoustic input signal;

means for determining a first derivative of the acoustic input signal energy; and means for utilizing the shifted and weighted differences for each of the P line spectral pair frequencies, the energy of the acoustic input signal, and the first derivative of the acoustic input signal energy to classify the acoustic input signal.

21. A method of generating a robust distance measure in a speech recognition system comprising the steps of:

determining energy coefficients of each of X frames of a speech input signal, wherein the step of determining energy coefficients comprises the steps of:

determining a first energy coefficient for each of the X frames, wherein the first energy coefficient represents original energy of the speech input signal for a respective one of the X frames; and determining a second energy coefficient for each of the X frames, wherein the second energy coefficient represents a first derivative of the original energy of the respective one of the X frames;

determining P order line spectral pair frequencies for the speech input signal;

representing the energy coefficients and line spectral pair frequencies as components of a vector:

determining respective differences between the energy coefficients of the speech input signal and corresponding energy coefficients of a plurality of reference codewords;

determining respective differences between the respective P line spectral frequencies of the speech input signal and corresponding P line spectral frequencies of the reference codewords; and utilizing the energy coefficients and line spectral pair frequencies respective differences to classify the speech input signal as one of the reference codewords.

22. The method of claim 21 wherein the step of determining the energy coefficients comprises the steps of:

for each of the X frames of the speech input signal, sampling the frame at a rate of n samples per second to represent the speech input signal as $s(n)_y$, y=1, 2, ..., X;

wherein determining a first energy coefficient for each of the X frames comprises generating an original energy coefficient, $E_y$, for each frame of speech input signal, wherein $E_y$ is defined as $$E_y = \sum_{n=0}^{N} |((s(n))_y)|^2;$$

wherein N represents a number of the samples in the yth frame:

wherein determining a second energy coefficient for each of the X frames comprises generating a first derivative of the original energy coefficient, $E'_y$, for each frame of speech input signal, wherein $E'_y$ is defined as $$E'_y = (E_y)' = E_y - E_{y-1}; \text{ and}$$

generating a second derivative of the original energy coefficient, $E''_y$, for each frame of speech input signal, wherein $E''_y$ is defined as $$E''_y = (E'_y)' = E'_y - E'_{y-1}.$$

23. The method of claim 22 further comprising the steps of:

normalizing the original energy coefficient, $E_y$;

normalizing the first derivative of the original energy coefficient, $E'_y$; and normalizing the second derivative of the original energy coefficient, $E''_y$.

24. The method of claim 21 further comprising the steps of:

shifting the respective differences of the first G line spectral pair frequencies by respective frequency shifting factors to at least partially compensate for frequency shifting of the respective speech input signal line spectral pair frequencies by acoustic noise; and weighting the respective differences for the remaining G+1 to P line spectral pair frequencies with respective frequency weighting factors.

25. The method of claim 24 further comprising the steps of:

weighting the respective differences of the first G line spectral pair frequencies by a first weighting constant, $\alpha_1$;

weighting the respective differences of the remaining G+1 to P line spectral pair frequencies by a second weighting constant, $\alpha_2$;

adding the respective differences together to generate a distance measure between the speech input signal and the reference speech signal; and utilizing the P line spectral pair frequency differences and energy coefficient differences to classify the speech input signal.

26. A method of robust speech recognition in an automotive environment comprising the steps of:

receiving a speech input signal corrupted by automotive environment noise;

representing each frame of the speech input signal with a vector f of P line spectral pair frequencies and X energy coefficients;

representing each of n codewords in a quantizer codebook as a respective vector $\hat{f}$ of P line spectral pair frequencies and X energy coefficients, wherein n is a nonnegative integer; and determining a distance measure between the vector f and each respective vector $\hat{f}$, wherein the distance measure, $d(f,\hat{f})$, is defined by:

$$d(f, \hat{f}) = \sum_{i=1}^{G} \alpha_1 \{(f_1 - e_i^{\beta_1} - \hat{f}_i)\}^2 + \sum_{i=G+1}^{P} \alpha_2 \{(f_i - \hat{f}_i)e_i^{\beta_2}\}^2 + \sum_{i=P+1}^{P+3} (\alpha_3(E_i - \hat{E}_i))^2;$$

using the distance measure to classify the speech input signal as recognized speech;

wherein the constants $\alpha_1$, $\alpha_2$, $\alpha_3$, $\beta_1$ and $\beta_2$ are set to substantially minimize quantization error, and $e_i$ is the error power spectrum of the input signal and a predicted input signal at the ith line spectral pair frequency of the input signal.

27. The method as in claim 26 further comprising the steps of:

using the distance measure, $d(f, \hat{f})$, to generate fuzzy distance measures in an FMQ/HMM speech recognition system.

28. The method as in claim 26 comprising the steps of:

using the distance measure, $d(f,\hat{f})$, to generate fuzzy distance measures in an FMQ/HMM/MLP speech recognition system.

29. The method as in claim 26 wherein the FMQ includes codebooks for each of u speech recognition system vocabulary words.

30. The method as in claim 26 wherein X is three, and the three energy coefficients are the original energy of a respective frame of the speech input signal, a first derivative of the original energy, and a second derivative of the original energy.

31. An apparatus comprising:

a first classifier capable of using Nth order vectors to generate first speech classification output data for classifying the input signal, wherein the input signal is represented by a number of frames with each frame represented by an Nth order vector, wherein components of each Nth order vector include respective line spectral pair frequency coefficients for P orders, a first energy coefficient representing original energy of the input signal for the respective frame, and a second energy coefficient representing a first derivative of the original energy of the speech input signal for the respective frame, wherein N and P are integers.

32. The apparatus of claim 31 further comprising:

a quantizer for determining respective distance measures for each respective frame of the input signal between the first G line spectral pair frequencies of the input signal and G corresponding order line spectral pair frequencies of a plurality of respective reference vectors, wherein the distance measure for an ith line spectral pair frequency and an ith reference signal line spectral pair frequency, for each of i=1 to G line spectral pair frequencies, is proportional to (i) a difference between the ith line spectral pair frequencies and the ith reference signal line spectral pair frequencies and (ii) a shift of the difference by an ith frequency shifting factor to at least partially compensate for frequency shifting of the ith input signal line spectral pair frequency by noise, wherein G is greater than or equal to one and less than or equal to P.

33. The apparatus of claim 32 wherein the quantizer is for further determining respective distance measures between ith input signal line spectral pair frequencies and the ith reference signal line spectral pair frequencies of the reference vectors, wherein the respective distance measures, for i=G+1 to P, are derived from (i) a difference between the ith input signal line spectral pair frequencies of each reference vector and the ith reference signal line spectral pair frequency and (ii) a weighting of the respective differences by an ith frequency weighting factor.

34. The apparatus of claim 33 wherein the quantizer is for further determining a distance measure, $d(f, \hat{f})$ between the input signal, f, and each of the reference speech signals, $\hat{f}$, $d(f, \hat{f})$ is defined by:

$$d(f, \hat{f}) = \sum_{i=1}^{G} \alpha_1 \{(f_1 - e_i^{\beta_1} - \hat{f}_i)\}^2 + \sum_{i=G+1}^{P} \alpha_2 \{(f_i - \hat{f}_i)e_i^{\beta_2}\}^2 + \sum_{i=P+1}^{P+3} (\alpha_3(E_i - \hat{E}_i))^2;$$

wherein $f_i$ and $\hat{f}_i$ are the ith line spectral pair frequencies in the input sign and the reference signal, respectively, $E_i$ and $\hat{E}_i$ are the ith energy coefficients, the constants $\alpha_1$, $\alpha_2$, $\alpha_3$, $\beta_1$, and $\beta_2$ are set to substantially quantization error, and $e_i$ is the error power spectrum of the input signal and a predicted input signal at the ith line spectral pair frequency of the input signal.

35. A method comprising the steps of:

determining energy coefficients of each of X frames of an input signal, wherein the step of determining energy coefficients comprises the steps of:

determining a first energy coefficient for each of the X frames, wherein the first energy coefficient represents original energy of the input signal for a respective one of the X frames; and determining a second energy coefficient for each of the X frames, wherein the second energy coefficient represents a first derivative of the original energy of the respective one of the X frames;

determining P order line spectral pair frequencies for the input signal;

representing the energy coefficients and line spectral pair frequencies as components of a vector;

determining respective differences between the energy coefficients of the input signal and corresponding energy coefficients of a plurality of reference codewords;

determining respective differences between the respective P line spectral frequencies of the input signal and corresponding P line spectral frequencies of the reference codewords; and utilizing the energy coefficients and line spectral pair frequencies respective differences to classify the input signal as one of the reference codewords.

* * * * *